No. 618,206. Patented Jan. 24, 1899.
C. H. KNIGHT.
MEANS FOR PROPELLING BICYCLES.
(Application filed Aug. 5, 1897.)
(No Model.) 2 Sheets—Sheet 1.
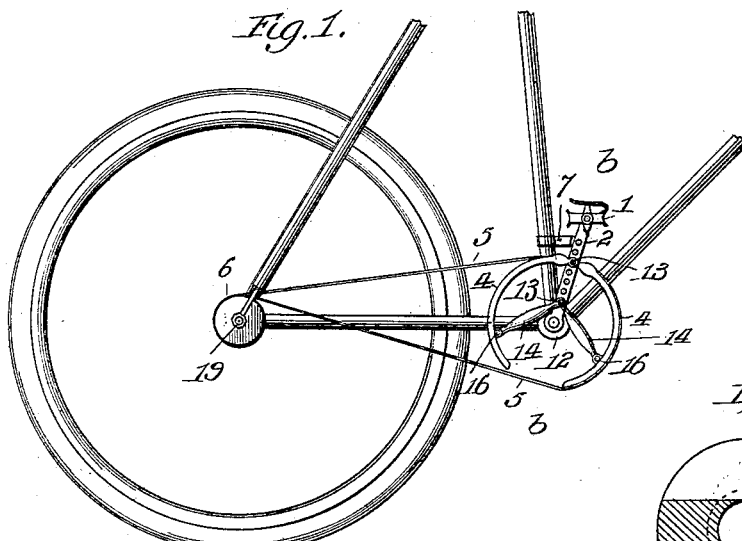
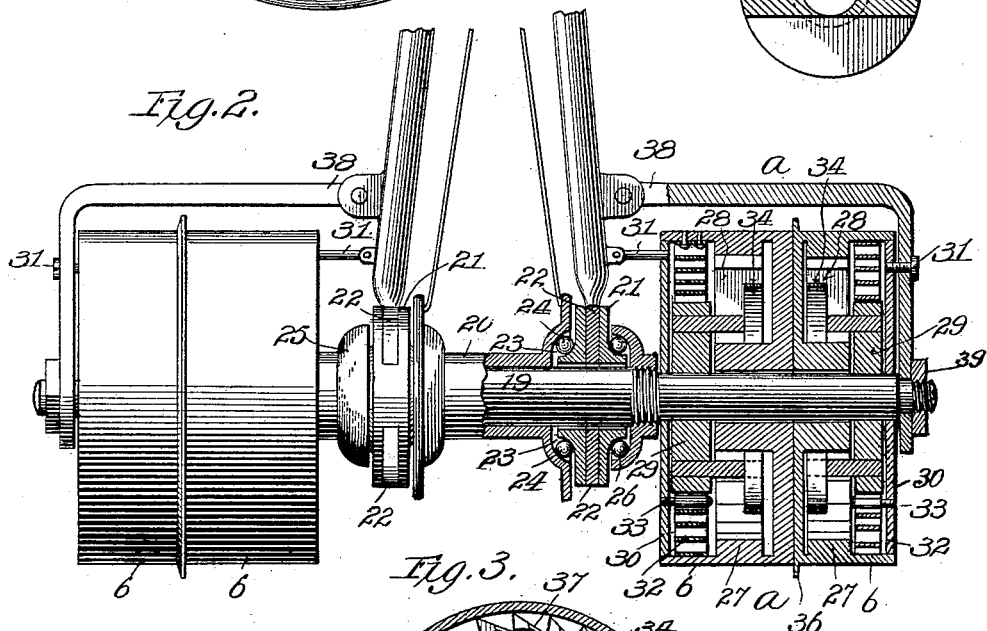
WITNESSES:
Harry S. Rohrer
J. P. Caverly
INVENTOR
Charles H. Knight
BY
R. A. Morrison
ATTORNEY.

No. 618,206. Patented Jan. 24, 1899.
C. H. KNIGHT.
MEANS FOR PROPELLING BICYCLES.
(Application filed Aug. 5, 1897.)

(No Model.) 2 Sheets—Sheet 2.

UNITED STATES PATENT OFFICE.

CHARLES H. KNIGHT, OF WASHINGTON, DISTRICT OF COLUMBIA.

MEANS FOR PROPELLING BICYCLES.

SPECIFICATION forming part of Letters Patent No. 618,206, dated January 24, 1899.

Application filed August 5, 1897. Serial No. 647,208. (No model.)

*To all whom it may concern:*

Be it known that I, CHARLES H. KNIGHT, a citizen of the United States, residing at Washington, in the District of Columbia, have invented certain new and useful Improvements in Means for Propelling Bicycles; and I do hereby declare the following to be a full, clear, and exact description of the invention, such as will enable others skilled in the art to which it appertains to make and use the same, reference being had to the accompanying drawings, which form a part of this specification.

My invention relates to propelling apparatus for bicycles; and it consists of the novel features of construction and arrangement of parts hereinafter fully described and claimed.

Similar numerals refer to similar parts throughout the specification and different views of the drawings.

Figure 5:
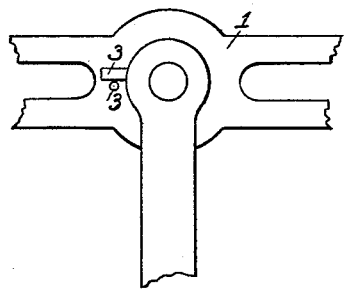
Figure 6:
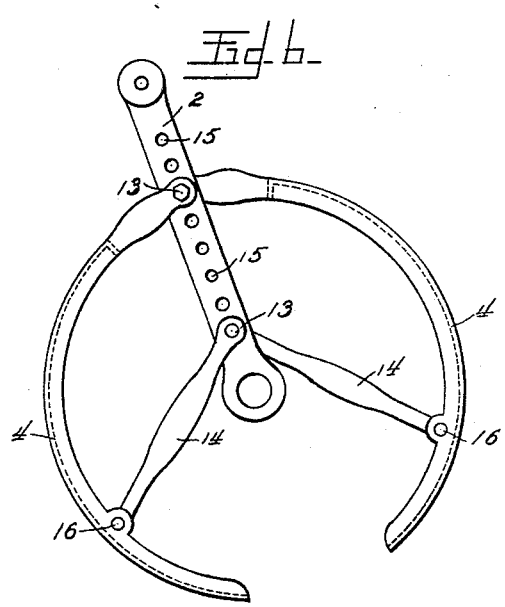

Figure 1 is a perspective of a portion of a bicycle to which my invention pertains. Fig. 2 is a view, partly in section, of the operative parts of my invention. Fig. 3 is a longitudinal sectional view taken on the line A A, Fig. 2. Fig. 4 is a detail of Fig. 2. Fig. 5 is a detail showing stops on the crank-arm and pedal. Fig. 6 is a side view of the crank-arm and segments carrying the belts shown in Fig. 1.

My bicycle is propelled in the usual way by the rider thereof.

Referring to the drawings, 1 is the pedal, connected to the crank-arm 2 by a rod in the usual way.

3 is a pin or stop on the crank-arm, against which a similar pin on the inner end of the pedal rests and holds the same in position for mounting, as seen in Fig. 5.

4 4 are segments of a pulley which carries the straps or belts connecting with the pulleys 6 6.

7 is a stop on the upright of the frame for preventing the crank-arm from being drawn back beyond a certain point by the spring in the pulleys 6 6.

14 14 are adjustable supporting-arms to the segments 4 4. The holes 15 in the crank are for the purpose of increasing or diminishing the diameter of the circular form of the segments 4 4 by changing the outer bolt 13 to an inner or outer hole of the crank-arm, the outer end of the supporting-arm 14 being hinged on bolts 16 16 through a boss on the inner side of the segments 4 4. By the various adjustments of said segments it will be readily seen the gear of the bicycle may be increased or diminished.

19 is a shaft secured rigidly to the hub 20 of the rear wheel of the bicycle.

21 is a double ball-bearing seat device secured rigidly to the supporting-forks 22 of the frame, through which the shaft 19 passes loosely. In the hub 20 are provided ball-bearing seats 23, to which are adapted ball-bearings 24. To the shaft 19 is threaded a ball-bearing seat 25, inclosing ball-bearings 26, by which the contact of both sets of ball-bearings may be adjusted.

To the shaft 19 are adapted two pulleys 6 6 to both ends of said shaft, fitted to revolve back and forth on the same. To the outer periphery of said pulleys, at a suitable point, are secured belts or straps 5 5, which connect with the segments 4 4. On the inner periphery of the pulleys 6 6 is formed a ratchet 27, (shown in Figs. 3 and 6,) to which engage the pawls 28 28.

29 29 are collars secured rigidly to the shaft 19, to which are pivoted the pawls 28 28.

30 30 are disks (through which the shaft 19 passes loosely) that are loosely fitted to the open ends of the pulleys 6 6 and are held in a fixed position by the pins 31 31.

32 32 are coiled springs encircling the collars 29 29.

33 33 are pins to which one end of the springs 32 32 are secured, the other end of said springs being secured to the inner periphery of the pulleys 6 6 at any desired point. The springs are of sufficient tension to wind the belts 5 5 around the pulleys 6 6 when the opposing force is removed. The springs located in the innermost pulleys are heavier and have an excess of tension greater than the springs in the outermost pulleys sufficient to raise the cranks to the position shown in Fig. 1.

The pawls 28 28 are provided with shoulders 34 34, to which are adapted suitable circular springs 35 for the purpose of keeping them always in contact with the ratchet.

36 is a flange made integral with the outer pulleys 6 6, serving as a guide for the belts 5 5 and preventing them from becoming entangled from any cause.

37 are bits of leather or other suitable material secured to the teeth of the ratchet 28 for the purpose of deadening the noise that would be made by the ratchet if not so provided.

38 is an arm serving as a step for mounting the bicycle and also as a means of holding the disk 30 in a fixed position, the lower end encircling the end of the shaft 19 and held in its place by the nut 39.

In the above-described invention I have endeavored to present a device and mechanism that will be found superior in practical operation to other inventions of a similar nature, not only in the saving of energy required to run it, but in the avoidance of friction, and also doing away with the filthy chain now in so general use on bicycles, the metal operating parts that require lubricating being inclosed, so that there are no parts, such as a chain or gears, to become unsightly and objectionable by being covered with a heavy coating of oil, dust, and grit.

The device represented is more particularly designed for fast riding or racing, being arranged so that the rider has not only the advantage of the momentum gained by forcing the pedal down, but also by pulling up on the toe-clip, as racers do.

It will be seen by the drawings and foregoing specification that the device is so arranged that the crank-arm makes only a part of a revolution, never being forced downward to more than a perpendicular position, and when the pressure is removed the pedal is quickly raised by the spring 32, located within the inner pulley, and if pulled up quickly will revolve the wheel in the same direction as when forced down.

The operation of my device is as follows: All the pawls 28, pivoted to the collars 29 and carried by the shaft 19, point in the direction to engage the ratchet-teeth whenever any of the straps are pulled on by the upward or downward movements of the pedals and impart a forward motion to the wheel-hub 20, secured to the shaft 19. It is immaterial whether the pedals are forced up or down or whatever position they may occupy at the time the force is applied. The wheel will be revolved forward, and the strap not pulled on will be wound upon the pulley, to which it is secured by the spring 32.

All the springs 32 pull in the same direction—i. e., pull the strap back over the top of the pulleys; but as one end of the strap which is wrapped on the innermost pulleys is secured to the uppermost segment 4, carried by the crank-arm 2, and the straps encircling the outermost pulleys have one end thereof secured to the undermost segments the tension of the spring operating on the one tends to pull the crank-arm up and the other to pull it down. Were the springs of equal tension, or nearly so, the crank-arm would not be pulled wholly up or wholly down. Therefore in order that the crank-arm may be raised to its highest elevation the springs located within the innermost pulleys are made stronger or of greater tension, the excess of tension being sufficient to quickly raise the crank-arm to its highest position.

There is no loss of propelling power by reason of the rider having to overcome the tension of the springs of greater power on the downstroke, because the racer always pulls up on the toe-clip on the upward swing of the crank, and in so doing he has all the excess of tension of the stronger spring to assist him; but in case the rider does not pull up on the toe-clip, but only raises his feet, so as to remove all pressure from the pedals while on the upward swing, he will still be aided in propelling his wheel by the power stored up by the excess of tension.

What I claim, and desire to secure by Letters Patent, is—

1. In a bicycle, the combination with a crank-shaft and its crank-arms, of segments adjustably secured at their inner ends to said arms, and provided with supporting-arms adjacent to their outer ends, pulleys on the driving-shaft, spring mechanism, and a pawl-and-ratchet device within said pulleys, and straps connecting the pulleys and segments.

2. In a bicycle, the combination with a crank-shaft, and crank-arms provided with perforations, of segments adjustably secured at their inner ends to said crank-arms and having supporting-arms secured to the segments and to said crank-arms, pulleys on the driving-shaft, springs, and pawl-and-ratchet mechanism within said pulleys, and straps connecting the pulleys and segments.

3. In a bicycle, the combination with a crank-shaft and its arms, of a pair of segments adjustably secured to each of said arms, duplicate pulleys on each end of the driving-shaft of the machine, springs, and pawl-and-ratchet mechanism within said pulleys, the spring in one pulley of each pair being of greater tension than that within the other pulley, and straps for independently connecting each of said pulleys with one of the segments on the crank-arms, said straps being so connected that the pulleys are oscillated in opposite directions.

4. In a bicycle, crank-arms carrying duplicate segments on each arm, a driving-shaft having duplicate pulleys on each end thereof, a strap connecting the upper segment with one pulley and a strap connecting the lower segment with the other pulley, all operatively combined as set forth.

In testimony whereof I affix my signature in presence of two witnesses.

CHARLES H. KNIGHT.

Witnesses:
 GEO. E. TERRY,
 W. F. HELLEN.